United States Patent [19]
Perina

[11] 3,732,600
[45] May 15, 1973

[54] ATTACHMENT ASSEMBLY

[75] Inventor: Joseph Perina, Huntington, N.Y.

[73] Assignee: American Velcro, Inc., Manchester, N.H.

[22] Filed: Apr. 15, 1971

[21] Appl. No.: 134,189

Related U.S. Application Data

[63] Continuation-in-part of Ser. No. 108,128, Jan. 20, 1971, abandoned.

[52] U.S. Cl. ................................................24/204
[51] Int. Cl. ...............................................A44b 17/00
[58] Field of Search ..................24/204, 203, DIG. 6; 248/205, 224

[56] References Cited

UNITED STATES PATENTS

| 3,471,903 | 10/1969 | Northrup | 24/204 |
|---|---|---|---|
| 3,537,149 | 11/1970 | Jakubaschk | 24/204 |
| 703,750 | 7/1902 | Taylor | 24/203 |
| 2,066,230 | 12/1936 | Roberts | 24/204 |
| 3,505,772 | 4/1970 | De Claire | 24/204 |
| 3,525,493 | 8/1970 | Chrietzberg | 248/224 |
| 3,576,304 | 4/1971 | Gillemot | 248/205 R |

Primary Examiner—Bernard A. Gelak
Attorney—Pennie, Edmonds, Morton, Taylor & Adams

[57] ABSTRACT

An attachment assembly for hooking elements of a separable fastener member is disclosed which comprises a first member having a plurality of said hooking elements projecting from one surface thereof and second member attached to the first member by means of at least two selectively orientated tangs projecting from the opposite surface of the first member and extending through corresponding receiving holes in the second member.

12 Claims, 6 Drawing Figures

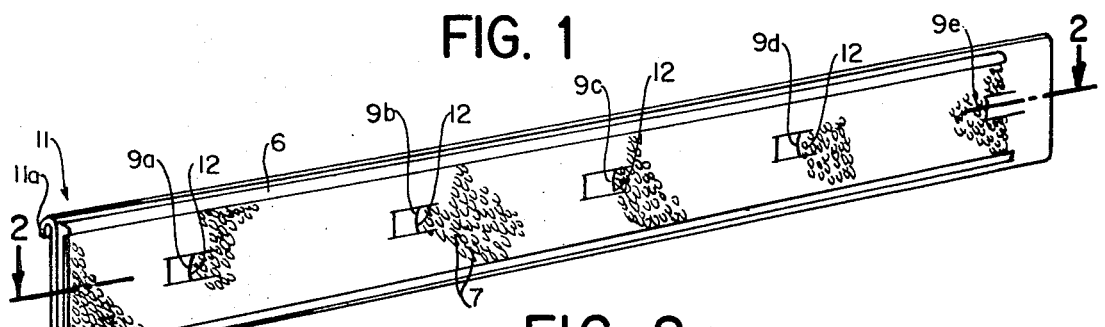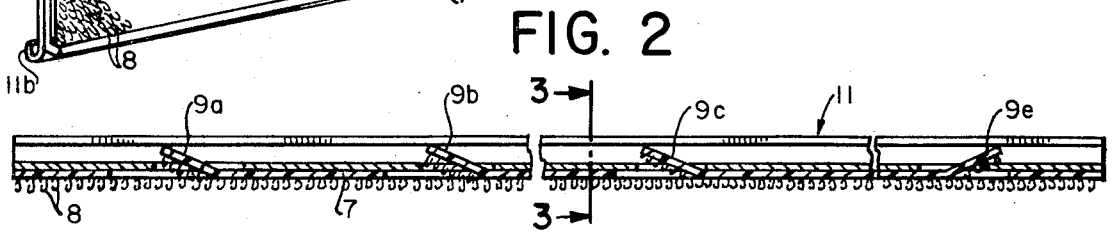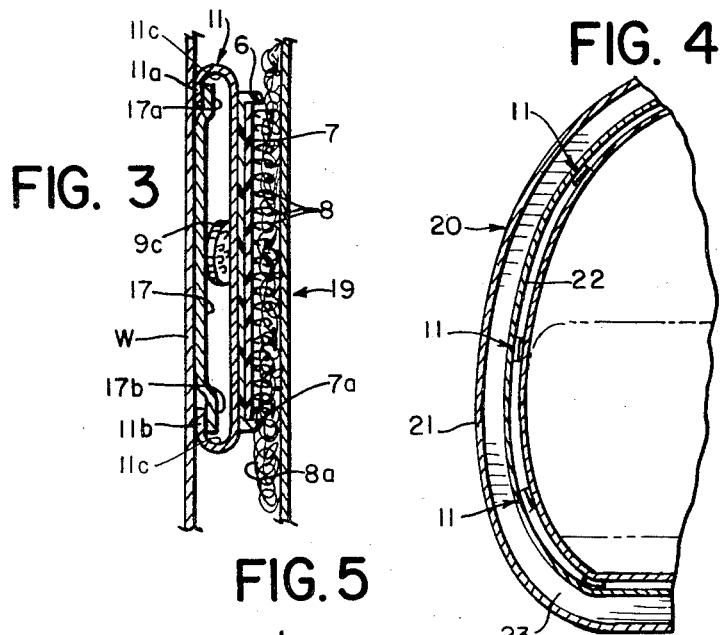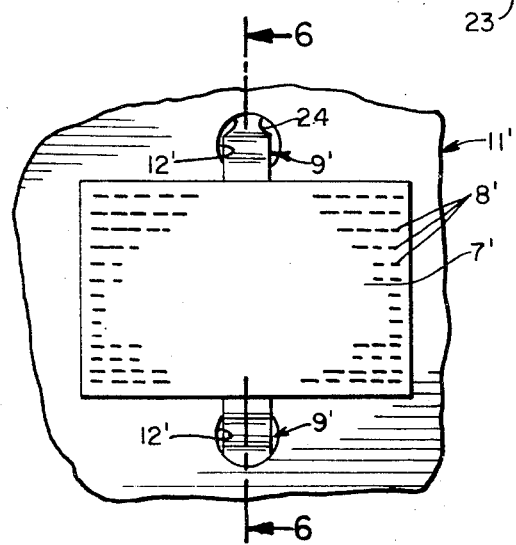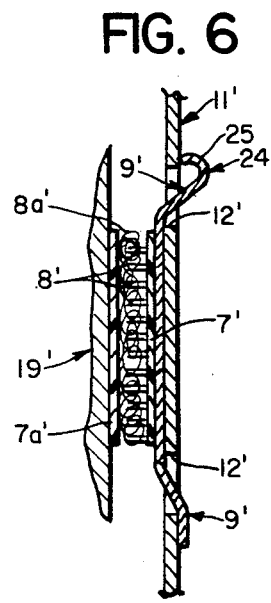
INVENTOR.
JOSEPH PERINA
BY Pennie, Edmonds, Morton, Taylor & Adams
ATTORNEYS

ATTACHMENT ASSEMBLY

RELATED APPLICATIONS

This application is a continuation-in-part application of application Ser. No. 108,128, filed Jan. 20, 1971, and entitled "Attachment Means for Hook and Loop Fasteners," now abandoned.

BACKGROUND OF THE INVENTION

Separable fasteners such as the hook and loop fasteners described in U.S. Pat. Nos. 2,717,437 and 3,009,235 are widely used for the purpose of attaching one object to another. In general, fastneers of this type include separable members each having a pile-like surface of hooking elements. Upon being pressed together in face-to-face relationship, the hooking elements of the separable members releasably interengage one another to hold the members together. In the above-mentioned U.S. Pat. Nos., each separable member comprises a sheet of woven synthetic material having raised loop threads wherein the loops of one member are cut at their outer extremities to form hook-type hooking elements while the loop threads of the other member remain uncut to form loop-type hooking elements. When these two members are pressed together in face-to-face relationship, there is a substantial engagement of the hook-type hooking elements with the loop-type hooking elements. A considerable effort must be applied to separate the members unless they are peeled apart in which case the members are separated quite easily.

The number of applications in which separable fasteners of the type described can be advantageously utilized is legion. One problem which characterizes the use of separable fasteners concerns attachment of the separable members themselves to adjacent structures. Adhesives are commonly used for this purpose. But adhesives are not suitable for some applications as for example, where the separable member is to be attached to a fabric material. For attachment to fabrics, the separable members are usually held in place by stitching. Conventional mechanical fasteners such as clips and staples, have also been used in the past for purposes of attaching separable members of the fastener but they too have presented problems in certain applications.

SUMMARY OF THE INVENTION

In accordance with the teachings of the present invention, there is provided an attachment assembly for hooking elements of a fastening member. In construction this assembly includes a first member from one surface of which a plurality of the hooking elements project. The first member has at least two spaced apart tangs projecting from the surface thereof opposite to the surface from which the hooking elements project. The tangs are inclined at an angle with respect to the surface of the first member from which they project and at least two of these tangs extend generally in opposite directions with respect to each other.

The attachment assembly of this invention further includes a second member having a series of spaced apart holes therein for receiving the tangs of the first member. The centers of these receiving holes are located in relation to each other in accordance with the relative location of the juncture points between the tangs and the first member.

Attachment of the two members of the assembly is accomplished simply by inserting the tangs of the first member into the corresponding receiving holes in the second member. To facilitate insertion, one or more of the tangs may be moved into a perpendicular attitude with respect to the first member. After insertion, the perpendicularly orientated tangs are returned to their initial inclined attitude to thereby lock the two members together. Each of the tangs acts to prevent separation of the first and second members when forces are applied normal to these members while the oppositely inclined tangs act to prvent slippage of the tangs out of their respective receiving holes and consequent separation of the two members when forces are applied to the members parallel to the interfacial plane of attachment therebetween.

In the presently preferred embodiment of the invention, the hooking elements which project from the first member of the attachment assembly comprise tiny upstanding hooks of the type described in U.S. Pat. No. 2,717,437. As mentioned above, when these hook-type hooking elements are pressed into face-to-face relationship with a plurality of complementary hooking elements in the form of tiny loops as described in U.S. Pat. No. 3,009,235, a very large number of the hook-type and loop-type hooking elements become releasably interengaged. In accordance with the teachings of the last mentioned U.S. patent disengagement between the hook and loop type hooking elements is strongly resisted when forces are applied parallel or normal to the interfacial plane of engagement. As the attachment assembly of this invention is constructed to prevent detachment of the first and second members due to similar normal and parallel forces applied thereto, it will be recognized that the attachment assembly of this invention compliments the nature of engagement between the hook and loop-type hooking elements.

BRIEF DESCRIPTION OF THE DRAWINGS

FIG. 1 is a perspective view of one embodiment of the attachment assembly of this invention.

FIG. 2 is a cross-sectional view taken along the lines 2—2 of FIG. 1.

FIG. 3 is a cross-sectional view taken along the lines 3—3 of FIG. 2.

FIG. 4 is a fragmentary detail showing the use of the attachment assembly in an aircraft structure.

FIG. 5 is a front elevation view, partly broken away of another embodiment of the attachment assembly of this invention.

FIG. 6 is a cross-sectional view taken along the lines 6—6 of FIG. 5.

DETAILED DESCRIPTION OF THE INVENTION

As shown in FIG. 1, the attachment assembly of this invention includes a strip 6 of semi-rigid material which defines a backing member to one surface of which a fastening member 7 also in the form of a strip is secured by any suitable means, as for example, by adhesively bonding the fastening member to the strip. The outwardly facing surface of the fastening member 7 is defined by a plurality of upwardly projecting hooking elements 8 of flexible resilient material. The backing member is semi-rigid in the sense that it is relatively stiff but nevertheless flexible and resilient enough to bend under an applied stress and return to its initial configuration when stress is relieved. For example, a plastic or metallic material having spring characteristics is suitable for the backing strip.

The backing strip 6 is provided with a series of spaced apart tangs 9a – 9e which project from the surface of the backing strip 6 opposite to the surface from which the hooking elements project. The tangs are disposed in a line extending along the longitudinal center axis of the backing strip 6 and each tang is inclined at an angle with respect to the backing strip. The tangs most remotely located in relation to each other (i.e. tangs 9a, 9e nearest opposite ends of the strip) extend in generally opposite directions with respect to each other (i.e. away from each other). In the construction shown in FIGS. 1 to 3, the tangs 9e through 9a are connected integrally to the backing strip having been produced by punching or by cutting out selected portions of the backing strip and thereafter permanently bending these cut-out portions into the appropriate inclined position. As shown, the portions of the backing strip which form the tangs have been cut out after the fastening membler 7 has been secured in place on the backing strip so that one surface of each tang is also provided with a plurality of hooking elements 8. It is to be recognized, however, that the portions of backing strip 6 which form the tangs may be cut out and bent to the desired angle prior to applying the fastening member 7 to the backing strip.

As shown, the backing strip 6 with the hooking elements 8 projecting therefrom is attached to a mounting member 11. For this purpose the mounting member 11 is provided with a series of spaced apart pre-punched or pre-drilled holes 12 which receive the tangs 9a through 9e projecting from backing strip 6 to thereby secure backing strip 7 with the hooking elements 8 projecting therefrom and mounting member 11 into locking engagement with respect to each other. The centers of holes 12 and mounting member 11 are located in relation to each other in accordance with the relative spacing between the junctures of tangs 9 and backing strip 6. That is, the distance between holes 12 as measured along the longitudinal center axis of backing strip 7 is approximately equal to the distance between the junctures of tangs 9 with backing strip 6.

In order to attach the backing strip 6 and mounting member 11 together, the tangs 9 can be bent into a perpendicular attitude with respect to the backing strip and in this position inserted into receiving holes 12 in mounting member 11. Upon release after they have been inserted into receiving holes 12, the tangs 9 will spring back to their original inclined position and clamp tightly against the edges of receiving holes 12 to secure the backing strip 6 and mounting member 11 together. Since end tangs 9a, 9e are inclined in opposite directions with respect to each other, movement of the backing strip 6 relative to the mounting member 11 is effectively prevented. Consequently, the tangs 9 on backing strip 6 cannot slip or slide out of their respective receiving holes and thus backing strip 6 and mounting member 11 are effectively locked together.

In the construction shown in FIG. 1 and 2, it will be seen that the mounting member 11 is provided, along its opposite longitudinal edges with bent over portions 11a and 11b which together define two opposed channels 11c on opposite sides of the mounting member. As shown, channels 11c face the underside of mounting member 11. That is, these channels face the surface of mounting member 11 opposite to the surface thereof which faces backing strip 6. As shown in FIG. 3, the mounting member 11 may be effectively fastened to an object, such as the wall W, simply by slipping the mounting strip 11 in a longitudinal direction over a retainer 17 suitably secured to wall W. As shown, the retainer has flanges 17a and 17b which extend into the channels on opposite sides of the mounting member and engage with the bent over portions 11a and 11b of mounting member 11 to thereby hold mounting strip 11 to wall W.

As shown in FIG. 3, any desired object such as the one indicated by reference numeral 19, may be secured to the attachment assembly of this invention. For this purpose a fastening member 7a having a pile-like surface of complimentary hooking elements 8a which are adapted to releasably interengage hooking elements 8 of fastening member 7 is secured by any suitable means to object 19.

In the construction shown in the drawings, the hooking elements 8 comprise tiny hooks while the complimentary hooking elements 8a comprise tiny loops. It is to be recognized, however, that these hook-type and loop-type hooking elements 8 and 8a may be interchanged so that the fastening member 7 is provided with loop-type hooking elements and fastening member 7a provided with hook-type hooking elements. In fact, it is contemplated that the hooking elements on each fastening member 7, 7a may include both hook-type and loop-type hooking elements.

The fastening members 7 and 7a with hook-type or loop-type hooking elements projecting therefrom may comprise the woven hook-pile or loop-pile material described in U.S. Pat. Nos. 2,717,437 and 3,009,235 or the knitted hook pile or loop-pile material described in copending commonly assigned U.S. Pat. application Ser. No. 659,669 filed Aug. 10, 1967. Alternatively, these hook and loop-type hooking elements may consist of the molded plastic hook-pile or loop-pile material described in commonly assigned copending U.S. Pat. application Ser. No. 824,597 filed May 14, 1969. Also, in the event molded plastic material is used, the hooking elements may be molded integrally with the backing strip 6.

When object 19 and the attachment assembly are pressed together so that the hooking elements 8 and 8a projecting respectively therefrom are brought into face-to-face relationship, a large number of hooking elements 7 and 7a will interengage one another to thereby securely hold object 19 to the attachment assembly. Separation of object 19 and the attachment assembly is strongly resisted when forces are applied parallel to the interfacial plane of engagement between hooking elements 8 and 8a, or normal thereto, but separation is quite readily effected by peeling forces applied to the interfacial plane of engagement either by peeling fastening member 7a away from fastening member 7 or by running a blade through the interfacial plane of engagement between the respective hooking elements.

FIG. 4 illustrates the application of the foregoing invention to the installation of hooking elements in an aircraft. In FIG. 4 an aircraft fuselage 20 is illustrated in partial cross section. Reference numeral 21 represents the outer skin and reference numeral 22, the double-section inner wall thereof. Stringer elements 23, which are similar in construction to retainer 17 described in connection with FIG. 3, are disposed at selected positions intermediate the two sections of the inner wall 22 of fuselage 20. With this arrangement, mounting member 11 of the attachment assembly can quickly be attached by slipping it over edge portions of the stringers 23. The backing strip or member 6 with the hooking elements 8 projecting therefrom may then be attached to the mounting strip 11 in the manner described above in connection with FIGS. 1 and 2. It will thus be seen that various panels forming part of the innermost section of inner wall 22 may be detachably mounted without requiring the drilling of holes, the use of adhesives etc.

In FIGS. 5 and 6 an alternative embodiment of the attachment assembly of this invention is illustrated. Here, the various parts of the attachment assembly are indicated by the same reference numerals as used in FIGS. 1 – 3 followed by the designation ('). As shown, the tangs 9' are disposed opposite to each other along opposite edges of backing strip 6' with the junctures between tangs 9' and backing member 6' located along these opposite edges. With this arrangement each tang extends beyond the peripheral edge of the backing strip, the purpose of which will be described below.

One of the tangs in this embodiment is constructed to snap into its respective receiving hole in mounting member 11'. For this purpose, this tang is provided with a snap head 24 at its free end. In the construction shown, the snap head 24 consists of a curved section 25 the outer convex surface of which functions as a cam surface coacting with the edge of its respective receiving hole 12'.

When pressed into hole 12', cam action between snap head 24 and the edge of receiving hole 12' causes the snap tang to flex and snap into locking engagement with mounting member 11' with the free end thereof abutting against the undersurface of the mounting member 11'.

As compared to the snap tang, the other tang is relatively straight but slightly bent at a point intermediate along its length. The straight tang functions as a lead tang for attaching backing member 6' and mounting member 11' together. That is, the straight tang is inserted into its receiving hole before the snap tang is snapped into its receiving hole. Due to the fact that this straight lead tang extends beyond the peripheral edge of backing member 60', it can easily be aligned with its receiving hole by a mere visual inspection. In a like manner, snap tang and its receiving hole in mounting member 11' are also readily aligned by visual inspection.

It will be seen from the foregoing description of this invention that a very simple yet effective means for attaching hooking elements has been devised. The flexible locking tangs provide a very simple and quick way of attaching hooking elements to any desired structure in a manner which causes these two components to be locked securely together. It is also to be recognized that the mounting member 11 described above in connection with the preferred embodiment of the invention may form an integral part of the structure to which the hooking elements are to be attached. For example, the mounting member may simply be comprised of a panel or plate provided with suitably located receiving holes for the tangs of the backing strip.

I claim:

1. An attachment assembly for hooking elements capable of separable engagement with complimentary hooking elements of a fastener comprising:
   a. a first member having:
      1. a plurality of said hooking elements projecting from one surface thereof; and
      2. at least two tangs projecting from the opposite surface thereof, each of said tangs being inclined at an angle with respect to said opposite surface with at least two said tangs extending away from each other; and
   b. a second member having a series of holes therein for engagingly receiving said tangs with the centers of said holes being arranged in relation to each other generally in accordance with the relative location of the juncture points between the tangs and the first member.

2. The attachment assembly according to claim 1 wherein the first member is in the form of elongated strip and each tang extends in a generally longitudinal direction with respect to the first member.

3. The attachment assembly according to claim 2 wherein said tangs are disposed in a line coincident with the longitudinal center line of the first member.

4. The attachment assembly according to claim 3 wherein said second member is provided with flange portions along opposite edge portions thereof to form two channels facing the surface of the second member opposite the surface thereof which faces the first member.

5. The attachment assembly according to claim 3 wherein the two tangs most remotely located relative to each other extend away from each other.

6. The attachment assembly according to claim 1 wherein at least one of the tangs extends beyond the peripheral edge of the first member.

7. The attachment assembly according to claim 6 wherein the junctures of said tangs with the first member are positioned along the edges of the first member.

8. The attachment assembly according to claim 7 wherein the junctures of the tangs with the first members are positioned along opposite edges of the first member.

9. The attachment assembly according to claim 8 wherein at least two tangs are positioned opposite to each other along said opposite edges of the first member.

10. An attachment for hook and loop fastener elements comprising a hook or loop fastener element in strip form, said element having a generally flat backing strip of a flexible resilient material, a multiplicity of resilient hooking fastener elements projecting throughout an area from an upper surface thereof, at least two tangs partially punched out from said backing strip to project from the under surface of said backing strip, each of said tangs being inclined at an angle with respect to said surface, at least two of said tangs being inclined in opposite directions; and a member defining holes therein for the reception of each said tang, the approximate centers of said holes being arranged to coincide with the juncture of said tangs and backing strip.

11. The attachment according to claim 10 wherein the tangs at opposite ends of said strip are inclined in opposite directions.

12. The attachment according to claim 10 wherein said member is flanged to form a channel and a bracket is provided for mounting said member by means secured in said channel.

* * * * *